(12) United States Patent
Anton

(10) Patent No.: US 8,562,122 B2
(45) Date of Patent: Oct. 22, 2013

(54) INK JET INKS HAVING IMPROVED CORROSION RESISTANCE FOR USE IN INK JET PRINT HEADS COMPRISING NICKEL OR NICKEL ALLOYS

(75) Inventor: Waifong Liew Anton, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 380 days.

(21) Appl. No.: 12/811,101

(22) PCT Filed: Oct. 9, 2008

(86) PCT No.: PCT/US2008/079262
§ 371 (c)(1),
(2), (4) Date: Jun. 29, 2010

(87) PCT Pub. No.: WO2009/094053
PCT Pub. Date: Jul. 30, 2009

(65) Prior Publication Data
US 2010/0289858 A1 Nov. 18, 2010

Related U.S. Application Data

(60) Provisional application No. 61/062,351, filed on Jan. 25, 2008.

(51) Int. Cl.
C09D 11/00 (2006.01)
(52) U.S. Cl.
USPC ........................................................ 347/100
(58) Field of Classification Search
USPC ........................................................ 347/100
See application file for complete search history.

(56) References Cited

U.S. PATENT DOCUMENTS

| | | | |
|---|---|---|---|
| 4,597,794 A | 7/1986 | Ohta et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,098,475 A | 3/1992 | Winnik et al. | |
| 5,310,778 A | 5/1994 | Shor et al. | |
| 5,519,085 A | 5/1996 | Ma et al. | |
| 5,554,739 A | 9/1996 | Belmont | |
| 5,571,311 A | 11/1996 | Belmont et al. | |
| 5,609,671 A | 3/1997 | Nagasawa | |
| 5,672,198 A | 9/1997 | Belmont | |
| 5,679,138 A | 10/1997 | Bishop et al. | |
| 5,698,016 A | 12/1997 | Adams et al. | |
| 5,708,095 A | 1/1998 | Grezzo Page et al. | |
| 5,718,746 A | 2/1998 | Nagasawa et al. | |
| 5,749,950 A | 5/1998 | Mahmud et al. | |
| 5,803,959 A | 9/1998 | Johnson et al. | |
| 5,837,045 A | 11/1998 | Johnson et al. | |
| 5,846,307 A | 12/1998 | Nagasawa et al. | |
| 5,891,231 A | 4/1999 | Gnerlich et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,968,243 A | 10/1999 | Belmont et al. | |
| 5,976,232 A | 11/1999 | Gore | |
| 6,051,645 A | 4/2000 | Suzuki et al. | |
| 6,123,759 A | 9/2000 | Mise et al. | |
| 6,136,890 A | 10/2000 | Carlson et al. | |
| 6,143,807 A | 11/2000 | Lin et al. | |
| 6,221,142 B1 | 4/2001 | Wang et al. | |
| 6,221,143 B1 | 4/2001 | Palumbo | |
| 6,232,369 B1 * | 5/2001 | Ma et al. | 523/161 |
| 6,281,267 B2 | 8/2001 | Parazak | |
| 6,287,374 B1 | 9/2001 | Yanagida et al. | |
| 6,323,257 B1 | 11/2001 | Moffatt et al. | |
| 6,329,446 B1 | 12/2001 | Sacripanto et al. | |
| 6,332,919 B2 | 12/2001 | Osumi et al. | |
| 6,375,317 B1 | 4/2002 | Osumi et al. | |
| 6,398,858 B1 | 6/2002 | Yu et al. | |
| 6,402,825 B1 | 6/2002 | Sun | |
| 6,468,342 B1 | 10/2002 | Itoh et al. | |
| 6,503,311 B1 | 1/2003 | Karl et al. | |
| 6,506,245 B1 | 1/2003 | Kinney et al. | |
| 6,648,463 B2 | 11/2003 | Koga et al. | |
| 6,852,156 B2 | 2/2005 | Yeh et al. | |
| 2002/0030721 A1 * | 3/2002 | Asakawa et al. | 347/65 |
| 2003/0089277 A1 | 5/2003 | Zakheim et al. | |
| 2004/0048973 A1 | 3/2004 | Akutsu et al. | |
| 2004/0061756 A1 * | 4/2004 | Kelly-Rowley et al. | 347/100 |
| 2005/0090599 A1 | 4/2005 | Spinelli | |
| 2007/0191507 A1 | 8/2007 | Sugimoto et al. | |

FOREIGN PATENT DOCUMENTS

EP 1818375 8/2007

* cited by examiner

Primary Examiner — Laura Martin
(74) Attorney, Agent, or Firm — John H. Lamming

(57) ABSTRACT

The present disclosure pertains to an aqueous ink jet ink having improved corrosion resistance for use in an ink jet print head including: (a) a colorant; (b) an aqueous vehicle; and (c) a certain random hydrophilic polymer additive, wherein the random hydrophilic polymer additive includes a random copolymer consisting of a hydrophilic component and an optional hydrophobic component, wherein the hydrophobic component includes a monomer selected from the group consisting of methyl acrylate and/or vinyl acetate and/or a hydrophobic monomer having a carbon to oxygen ratio of at least about 2.5, and wherein the hydrophobic component has a concentration of less than about 40% by weight, based on the weight of the polymer additive, and the hydrophilic component includes at least one non-acidic hydrophilic monomer having a carbon to oxygen ratio of less than about 2.5, and a monomer with an ionizable acidic group with a carbon to oxygen ratio of less than about 2.5 present in the amount of at least 10%, based on the weight of the polymer additive; and wherein the ink jet print head includes an ink flow passage, at least a portion of which is formed of nickel-containing metal such as nickel or nickel alloy.

24 Claims, No Drawings

INK JET INKS HAVING IMPROVED CORROSION RESISTANCE FOR USE IN INK JET PRINT HEADS COMPRISING NICKEL OR NICKEL ALLOYS

CROSS-REFERENCE TO RELATED APPLICATION

This application claims priority from U.S. Provisional Application Ser. No. 61/062,351 (filed Jan. 25, 2008), the disclosure of which is incorporated by reference herein for all purposes as if fully set forth.

BACKGROUND OF THE DISCLOSURE

The present disclosure pertains to ink jet inks, and in particular to aqueous ink jet inks having improved corrosion resistance. The disclosure further relates to the use of ink jet inks having improved corrosion resistance in ink jet print heads comprising nickel or nickel alloys.

Ink jet printing is a non-impact printing process in which droplets of ink are deposited on a substrate, such as paper, to form the desired image. The droplets are ejected from a printhead in response to electrical signals generated by a microprocessor. Ink jet printers offer low cost, high quality printing and have become a popular alternative to other types of printers.

An ink-jet ink is characterized by a number of necessary properties, including color, jetability, decap time (latency), drying time and shelf-life, among others. There is, however, often a tradeoff between these properties because improving one property can result in the deterioration of another property.

Both soluble (dye) and insoluble (pigment) colorants have been used in ink jet inks. Pigments are advantageous because they tend to provide more water-fast and light-fast images than dye inks.

These inks may be used in ink jet recording apparatuses several types of which include ink jet print heads provided with ink flow passages formed of nickel-containing metal such as nickel or nickel alloys. When the inks used therein are aqueous ink jet inks, the nickel may be eluted into the ink with long term contact, and metallic corrosion may result. This corrosion of the metal may cause deterioration in the accuracy of the discharge and landing of the ink droplets.

A need exists for ink jet inks having improved corrosion resistance without impacting ink performance when used in print heads comprising nickel-containing metal such as nickel or nickel alloys.

SUMMARY OF THE DISCLOSURE

The disclosure provides an aqueous ink jet ink and an ink jet print head combination, wherein the ink jet ink comprises:
(a) a colorant;
(b) an aqueous vehicle; and
(c) a random hydrophilic polymer additive, wherein the random hydrophilic polymer additive is a random copolymer comprised of a hydrophilic component and an optional hydrophobic component, wherein the hydrophilic component comprises a monomer (monomer A) having an ionizable acidic group and a carbon to oxygen ratio of less than about 2.5, wherein said monomer is present in the amount of at least 10% by weight, based on the weight of the polymer additive, and at least one non-acidic hydrophilic monomer (monomer B) having a carbon to oxygen ratio of less than about 2.5, and wherein the hydrophobic component comprises a monomer (monomer C) selected from the group consisting of methyl acrylate, vinyl acetate, and a hydrophobic monomer having a carbon to oxygen ratio of at least about 2.5, and mixtures thereof, and wherein the hydrophobic component has a concentration of less than about 40% by weight, based on the weight of the polymer additive; and wherein the ink jet print head comprises an ink flow passage, at least a portion of which is formed of a nickel-containing metal such as nickel or nickel alloy. The acidic group in the polymer additive may be selected from the group consisting of carboxylic acid, sulfonic acid and phosphonic acid.

Typically, the colorant is selected from the group consisting of a pigment dispersion, a self dispersible pigment and a dye.

The corrosion resistance is improved by at least about 10%, when compared to an additive-free ink jet ink.

In a typical embodiment of the present disclosure, the polymer additive in the ink is a random copolymer comprised of components A to C as follows:

A. at least 10 weight % of a hydrophilic monomer (as defined above) selected from the group consisting of monomers having an ionizable acidic group, more typically an acrylic or methacrylic monomer having an ionizable acid group;
B. at least 25 weight % of a non-acidic monomer or a combination of monomers selected from the group consisting of monomers of the following structure:

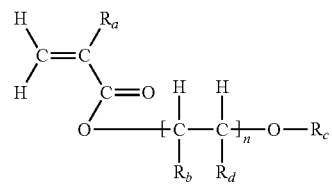

wherein n is an integer greater than 0, typically 1 to 10, more typically 1 to 4; $R_a$, $R_b$ and $R_d$ are independently either H or alkyl, and $R_c$ is alkyl;

C. 0-40 weight % of a hydrophobic monomer (as defined above) or combinations of such monomers, more typically a hydrophobic acrylic or methacrylic monomer; wherein the total of monomers A+B+C is equal to 100 weight %, and the total of monomers A+B is about 55-100 weight % (weight % of monomers is based on the weight of the polymer additive) and wherein the weight ratio of monomer B:A is in the range of about 1:1 to about 10:1.

The present disclosure also provides an ink jet printer comprising the ink jet ink and ink jet printhead combination described above.

DETAILED DESCRIPTION OF THE PREFERRED EMBODIMENTS

The random hydrophilic polymer additive of the disclosure can be utilized in ink jet inks which have jetting performance, printing reliability, printed image quality as well as storage stability that are not negatively affected by the presence of this polymer additive while at the same time having improved corrosion resistance. The random polymers of this disclosure have been found to be more efficient for improving corrosion resistance than the block and graft polymers. They may be used in ink jet printers comprising an ink jet print head provided with an ink flow passage, wherein at least a portion of the ink passages comprise nickel-containing metal, such as nickel or nickel alloy.

Random Hydrophilic Polymer Additive

The random hydrophilic polymer additive is a random copolymer formed by copolymerization of the monomers described hereinafter. The random hydrophilic polymer additive is soluble or dispersible in the ink vehicle and can generally be characterized as comprising a hydrophilic component and an optional hydrophobic component.

The hydrophobic component comprises a monomer selected from the group consisting of methyl acrylate, vinyl acetate, a hydrophobic monomer having a carbon to oxygen ratio of at least about 2.5, and mixtures thereof. The hydrophobic component has a concentration of 0% to less than about 40% by weight, more typically less than about 30% by weight, and most typically less than about 15% by weight, based on the weight of the polymer additive. When the hydrophobic component has a concentration of greater than about 40% by weight it is expected that the polymer additive would have too high an affinity to, and therefore, increased adsorption onto other hydrophobic surfaces that may be present, for example, pigment surfaces or plastic ink pathways, leaving insufficient amounts of polymer available to coat the nickel or nickel alloy and provide corrosion protection.

The hydrophilic component comprises at least one non-acidic hydrophilic monomer having a carbon to oxygen ratio of less than about 2.5, and a hydrophilic monomer with an ionizable acidic group with a carbon to oxygen ratio of less than about 2.5 present in the amount of at least about 10%, more typically at least about 20%, still more typically at least about 25%, and most typically at least about 30%, based on the weight of the polymer additive. It is expected that amounts of the ionizable acidic group of less than about 10% would results in a reduced number of acid groups to coordinate with the nickel or nickel alloy surfaces. Alternately, if the amount is too high, the polymer additive would be expected to have too much solubility in the aqueous portion of the ink, and therefore may not deposit on the surfaces of the ink channels comprising the nickel or nickel alloy. This insufficient level of adsorption of the polymer additive on the nickel or nickel alloy containing surfaces could then result in insufficient protection of these surfaces from corrosion. The acidic group may be selected from the group consisting of carboxylic acid, sulfonic acid and phosphonic acid.

Typically the random hydrophilic polymer additive is not a natural polymer nor a derivative thereof. Mixtures of monomers may be used to form the hydrophobic and hydrophilic components, respectively.

Some typical hydrophobic monomers having a carbon to oxygen ratio of at least about 2.5 (also referred to herein as "monomer C") include, for example, benzyl methacrylate, butyl methacrylate, methyl methacrylate, ethyl methacrylate, propyl methacrylate, hexyl methacrylate, 2-ethylhexyl methacrylate, octyl methacrylate, lauryl ethacrylate, stearyl methacrylate, phenyl methacrylate, phenoxyethyl methacrylate, p-tolyl methacrylate, sorbyl methacrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, p-tolyl acrylate, sorbyl acrylate, styrene, alpha-methyl styrene, substituted styrenes, N-alkyl acrylamides, N-alkyl methacrylamides, vinyl butyrate and vinyl benzoate. More typically, the hydrophobic monomers having a carbon to oxygen ratio of at least about 2.5 include benzyl methacrylate, butyl methacrylate or butyl acrylate.

Some suitable monomers with ionizable acid groups with a carbon to oxygen ratio of less than about 2.5 (also referred to herein as "monomer A") include, for example, methacrylic acid, acrylic acid, maleic acid, maleic acid mono-methyl ester, maleic acid mono-ethyl ester, maleic acid mono-propyl ester, maleic acid mono-butyl ester, maleic acid mono-pentyl ester, maleic acid mono-hexyl ester, fumaric acid, fumaric acid mono methyl ester, fumaric acid mono-ethyl ester, fumaric acid mono-propyl ester, fumaric acid mono-butyl ester, fumaric acid mono-pentyl ester, fumaric acid mono-hexyl ester, itaconic acid, itaconic acid mono-methyl ester, itaconic acid mono-ethyl ester, itaconic acid mono-propyl ester, itaconic acid mono-butyl ester, itaconic acid mono-pentyl ester, crotonic acid, acryloyloxyethyl succinate, acrylamido-glycolic acid, acrylamido-propane sulfonic acid and acrylamido-methyl-propane sulfonic acid. Acid monomers having a carbon to oxygen ratio of less than about 2.5 such as methacrylic acid are typically preferred.

Some suitable non-acidic hydrophilic monomers with a carbon to oxygen ratio of less than about 2.5 (also referred to herein as "monomer B") typically include non-ionic, non-acidic monomers selected from, for example, ethoxy triethyleneglycol methacrylate, (methoxy-ethoxy)ethyl acrylate, methoxy polyethylene glycol methacrylate, glycidyl methacrylate, glycidyl acrylate, hydroxyethyl methacrylate, hydroxypropyl methacrylate, hydroxyethyl acrylate, or hydroxypropyl acrylate. More typically, the hydrophilic non-ionic, non-acidic monomer with carbon to oxygen ratio of less than about 2.5, includes ethoxy triethyleneglycol methacrylate, polyethylene glycol methacrylate, or hydroxyethyl methacrylate.

In a specific embodiment, the non-acidic hydrophilic monomers have the following structure:

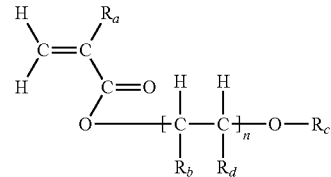

wherein n is an integer greater than about 0, more typically n is about 1 to about 10, still more typically about 1 to about 4, $R_a$, $R_b$ and $R_d$ are independently either H or alkyl, and $R_c$ is alkyl.

Typical monomers represented by this structure may include, for example, ethoxy triethyleneglycol methacrylate, (methoxy-ethoxy)ethyl acrylate, methoxy polyethylene glycol methacrylate, polyethylene glycol monomethacrylate, glycidyl methacrylate, or glycidyl acrylate.

Typically these polymers have a number average molecular weight of about 1,000 to about 10,000, more typically about 3,500 to about 6,500

In an embodiment of the present disclosure, certain random copolymers have been found particularly useful for reducing the amount of nickel corrosion in nickel-containing ink jet print heads. These polymers are obtained by copolymerization of the following monomers A to C:

A. at least 10 weight % of a hydrophilic monomer selected from the group consisting of monomers having an ionizable acidic group (including any of those listed above), more typically an acrylic or methacrylic monomer having an ionizable acidic group;

B. at least 25 weight % of a monomer or a combination of monomers selected from the group consisting of monomers of the following structure:

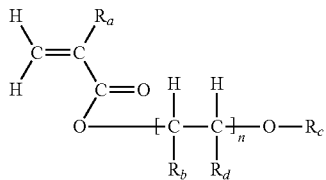

wherein n is an integer greater than 0, typically 1 to 10, more typically 1 to 4; $R_a$, $R_b$ and $R_d$ are independently either H or alkyl, and $R_c$ is alkyl;

C. 0-40 weight % of a hydrophobic monomer or combinations of such monomers (including any of those listed above), more typically a hydrophobic acrylic or methacrylic monomer;

wherein the total of monomers A+B+C is equal to 100 weight %, and the total of monomers A+B is 55-100 weight % (weight % of monomers is based on the weight of the polymer additive) and typically wherein the weight ratio of monomer B:A is in the range of about 1:1 to about 10:1.

The acid groups on the random hydrophilic polymer additive will typically be partially or completely neutralized with base to the salt form. Some examples of useful bases include alkali metal hydroxides (lithium, sodium, and potassium hydroxide), alkali metal carbonate and bicarbonate (sodium and potassium carbonate and bicarbonate), organic amines (mono-, di-, tri-methylamine, morpholine, N-methylmorpholine), organic alcohol amines (N,N-dimethylethanolamine, N-methyl diethanolamine, mono-, di-, tri-ethanolamine), ammonium salts (ammonium hydroxide, tetra-alkyl ammonium hydroxide), and pyridine.

The random hydrophilic polymer additive may be present in the amount of about 0.01 wt % to about 3 wt %, more typically about 0.10 wt % to about 1.0 wt %, based on the total weight of ink. Upper limits are dictated by ink viscosity or other physical limitations required for proper formation of ink drops by the ink jet pen. The lower limits are dictated by the type and amount of colorants required to impart the desired color density to the image. Thus inks containing lower amounts of carbon black will require lower amounts of polymer additive for effective reduction of corrosion.

The random hydrophilic polymer additive to pigment weight ratio is typically about 1:1 to about 1:40, more typically about 1:6 to about 1:40, still more typically about 1:10 to about 1:40, and most typically about 1:20 to about 1:40. Lower random hydrophilic polymer additive to pigment weight ratios may offer no further improvement in corrosion properties, while the increased polymer content may lead to higher viscosities or the increased salt content that can lead to worsening of latency of the inks thus interfering with proper formation of ink drops from the ink jet nozzles. Higher pigment to random hydrophilic polymer additive weight ratios results in insufficient reduction of corrosion.

Ink Jet Ink Composition

The ink jet ink of the present disclosure, as well as ink jet inks in general, are comprised of vehicle, colorant and optionally other ingredients such as surfactants, binders, buffers, biocides and so forth. The ink vehicle is the liquid carrier (or medium) for the colorant and optional additives. The ink colorant refers to any and all species in the ink that provide color. The ink colorant may be a single colored species or a plurality of colored species collectively defining the final ink color. Typical colorants may be dyes, pigment dispersions, or self dispersible pigments.

Vehicle

The ink of the present invention comprises an aqueous vehicle. The term "aqueous vehicle" refers to a vehicle comprised of water or a mixture of water and one or more organic, water-soluble vehicle components commonly referred to as co-solvents or humectants. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

Examples of co-solvents that commonly act as penetrants include higher alkyl glycol ethers and/or 1,2-alkanediols. Glycol ethers include, for example, ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediol penetrants include linear, for example, 1,2-($C_5$ to $C_8$)alkanediols and especially 1,2-pentanediol and 1,2-hexanediol.

The aqueous vehicle typically will contain about 65 wt % to about 95 wt % water with the balance (i.e., about 35% to about 5%) being organic water-soluble vehicle components. The amount of aqueous vehicle in the ink is typically in the range of about 75 wt % to about 99.8 wt % of the total ink.

Colorant

The ink colorant comprises a pigment dispersion, a self dispersed pigment, a dye, or mixtures thereof. Raw pigment is insoluble and typically non-dispersible in the ink vehicle and must be treated in order to form a stable dispersion. Self dispersing pigment ("SDP") colorants which term refers to pigment particles whose surface has been chemically modified with hydrophilic dispersibility-imparting groups that allow stable dispersion in an aqueous vehicle without a separate dispersant are particularly useful in this disclosure. More particularly, in the present disclosure, the hydrophilic dispersibility-imparting surface groups are ionizable, and even more particularly the dispersibility-imparting surface groups are anionic.

The SDPs may be prepared by grafting a functional group or a molecule containing a functional group onto the surface of the pigments outlined above, by physical treatment (such as vacuum plasma), or by chemical treatment (for example, oxidation with ozone, hypochlorous acid or the like). A single type or a plurality of types of hydrophilic functional groups may be bonded to one pigment particle.

Most commonly, the anionic moieties of the dispersibility-imparting groups are carboxylate (also referred to as carboxyl) or sulfonate groups which provide the SDP with a negative charge when dispersed in aqueous vehicle. The carboxylate or sulfonate groups are usually associated with monovalent and/or divalent cationic counter-ions.

Self-dispersing pigments are described, for example, in the following U.S. Pat. Nos.: 5,571,311; 5,609,671; 5,968,243; 5,928,419; 6,323,257; 5,554,739; 5,672,198; 5,698,016; 5,718,746; 5,749,950; 5,803,959; 5,837,045; 5,846,307; 5,895,522; 5,922,118; 6,123,759; 6,221,142; 6,221,143; 6,281,267; 6,329,446; 6,332,919; 6,375,317; 6,287,374; 6,398,858; 6,402,825; 6,468,342; 6,503,311; 6,506,245 and 6,852,156.

Commercial sources of SDP include Cabot Corporation, Billerica, Mass., USA; Toyo Ink USA LLC, Addison, Ill., USA; and, Orient Corporation of America, Kenilworth, N.J., USA.

The amount of surface treatment (degree of functionalization) can vary. Advantageous (higher) optical density can be achieved when the degree of functionalization (the amount of hydrophilic groups present on the surface of the SDP per unit surface area) is less than about 3.5 µmoles per square meter of pigment surface (3.5 µmol/m$^2$), more typically less than about 3.0 µmol/m$^2$. Degrees of functionalization of less than about 1.8 µmol/m$^2$, and even less than about 1.5 µmol/m$^2$, are also suitable and may be more typical for certain specific types of SDPs.

In a typical embodiment, the anionic functional group(s) on the SDP surface are primarily carboxyl groups, or a combination of carboxyl and hydroxyl groups. Even more typically the anionic dispersibility-imparting groups are directly attached to the pigment surface and are primarily carboxyl groups, or a combination of carboxyl and hydroxyl.

More typical SDPs in which anionic dispersibility-imparting groups are directly attached to the pigment surface may be produced, for example, by a method described in U.S. Pat. No. 6,852,156. Carbon black treated by the method described in this publication has a high surface active hydrogen content which is neutralized with base to provide very stable dispersions in water. Application of this method to colored pigments is also possible.

The levels of SDP employed in formulated inks are those levels that are typically needed to impart the desired optical density to the printed image. Typically, SDP levels are in the range of about 0.01 to about 10% by weight of the ink.

In another embodiment of the present disclosure, the pigment is stabilized to dispersion in the aqueous vehicle by treatment with a dispersant, in particular an anionic dispersant. The term "dispersant" as used herein is generally synonymous with the terms "dispersing agent" and "suspending agent" which are also found in the art.

Examples of pigments with coloristic properties useful in ink jet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. Colorants are referred to herein by their "C.I." designation established by Society Dyers and Colourists, Bradford, Yorkshire, UK and published in The Color Index, Third Edition, 1971. Commercial sources of pigment are generally well known in the art.

The dispersant can be any suitable anionic dispersant such as, for example, those disclosed in U.S. Pat. Nos. 4,597,794; 5,085,698 and 5,519,085; and 6,143,807 herein before referenced. Also, the dispersant can be, for example, those anionic dispersants disclosed in U.S. Pat. Nos. 5,708,095 and 6,136,890; and U.S. Patent Pub. No. US200510090599.

The anionic moieties of the anionic dispersant are predominately carboxyl groups, and in another typical embodiment, the anionic moieties of the anionic dispersant consist essentially of carboxyl groups only.

To prepare a pigment dispersion, the pigment and dispersant are premixed and then dispersed or deflocculated in a milling step. The premixture includes an aqueous carrier medium (such as water and, optionally, a water-miscible solvent) when the milling step involves a wet milling operation. The milling may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022,592, 5,026,427, 5,310,778, 5,891,231, 5,679,138, 5,976,232 and U.S. Patent Pub. No. 2003/0089277. The pigment dispersion as made is typically in a concentrated form (dispersion concentrate), which is subsequently diluted with a suitable liquid containing the desired additives to make the final ink.

The range of useful particle size after dispersion is typically about 0.005 micron to about 15 micron. Preferably, the pigment particle size should range from about 0.005 to about 5 micron and, most preferably, from about 0.005 to about 1 micron. The average particle size as measured by dynamic light scattering is less than about 500 nm, preferably less than about 300 nm.

The levels of pigment employed in formulated inks are those levels needed to impart the desired optical density to the printed image. Typically, pigment levels are in the range of about 0.01 wt % to about 10 wt %, and more typically from about 1 wt % to about 9 wt %.

In another embodiment of the present disclosure, a dye may be used as the ink colorant. Some suitable dyes include anionic dyes typically having sulfonate and carboxylate groups and cationic dyes typically having polymethine and arylcarbonium groups. Reactive dyes may also be used. Some useful dyes are disclosed in U.S. Pat. No. 5,098,475.

Mixtures of any of the ink colorants described above may also be used.

Other Ingredients

Other ingredients may be formulated into the ink jet ink, to the extent that such other ingredients do not interfere with the stability and jetability of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5% and more typically in amounts of no more than 2%.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'-N, N,N',N'',N'''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Salts other than the chelators may also be used, for example, to adjust the cation ratio. Biocides may be used to inhibit growth of microorganisms.

Ink Properties

Jet velocity, separation length of the droplets, drop size and stream stability are greatly affected by the surface tension and the viscosity of the ink. Pigmented ink jet inks typically have a surface tension in the range of about 20 mN.m-1 to about 70 mN.m-1 at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range, these inks are particularly suited to lower viscosity applications. Thus the viscosity (at 25° C.) of these inks can be less than about 7 mPa·s, or less than about 5 mPa·s, and even, advantageously, less than about 3.5 mPa·s. pH is typically between 5 and 9, more typically between 6.5 and 8.0. These inks are useful in print heads comprising an ink flow channel comprising nickel or nickel alloy.

Ink Sets

Ink jet inks are generally used in sets. An ink set comprises at least two differently colored inks, more typically at least three differently colored inks such as cyan, magenta, and yellow (CMY), and more commonly at least four differently colored inks such as cyan, magenta, yellow, and black (CMYK). An ink set may employ one or more inks as described herein above.

In addition to the typical CMYK inks, ink sets may further comprise one or more "gamut-expanding" inks, including different colored inks such as an orange ink, a green ink, a red ink and/or a blue ink, and combinations of full strength and light strengths inks such as light cyan and light magenta.

Method of Printing

The inks of the present disclosure may be printed with any suitable ink jet printer comprising an ink jet print head, typically a piezoelectric ink jet print head, having one or more ink jet ink flow channels or passages, at least a portion of which is formed of a nickel-containing metal.

The nickel-containing metal may be nickel alone or an alloy containing nickel and a metal other than nickel (a nickel alloy). Examples of other metals include iron, carbon, chromium, molybdenum, copper, aluminum, titanium, niobium, tantalum, cobalt, tungsten silicon, nitrogen, sulfur, manganese, etc. in the nickel-containing alloy, the nickel content is not particularly limited. The nickel content for example may be in the range of 1 to 99.5% by weight. In a typical example, the nickel content is in the range of 10 to 70% by weight. The nickel-containing alloy may be, for example, an alloy containing nickel and iron (a nickel-iron alloy). Examples of nickel-iron alloys include 42 alloy. In the 42 alloy, the nickel content is approximately 42% with the balance being iron. The nickel alloy may contain components other than metals as well.

The configuration of the ink jet print head which is used herein to eject the ink onto a substrate is not particularly limited and can be the same as those conventionally employed in ink jet printers. For instance, the ink jet printer may comprise a head unit provided with a nickel-containing ink jet print head configured, as for example, as shown in U.S. Pat. No. 6,648,463, with the head unit also containing a carrying section for replaceable ink cartridges filled with, for example, four colors of ink, of cyan, magenta, yellow, and black. The nickel-containing ink jet print head may also be integrally formed on a replaceable ink jet cartridge, with the entire head/cartridge combination being detachably installed in the printer. The ink ejecting method that is employed for the ink jet print head is also not limited herein, with piezoelectric element methods, thermal bubble-jet methods, and electrostatic attraction methods being some of the more conventional possibilities.

Piezoelectric Ink jet print heads having ink jet channels comprising nickel or nickel alloy are described more fully in previously mentioned U.S. Pat. No. 6,648,463 and in U.S. Patent Application Publication No. 2007/0191507, the disclosures of which are incorporated herein by reference.

The substrate can be any suitable substrate including plain paper, such as common electrophotographic copier paper; treated paper, such as photo-quality ink jet paper; textile; and non-porous substrates including polymeric films such as polyvinyl chloride and polyester.

The following examples illustrate the disclosure without, however, being limited thereto.

EXAMPLES

Procedures

Test Procedure for Determining Drainage from Plastic Surfaces

Clean Nalgene® bottles of high density polyethylene, 60 mL capacity, were charged with about 30 mL of test ink liquids. After allowing the samples to rest undisturbed for at least 12 hours, the bottles were inverted so as to allow the ink liquids to drain down to the lower half of the container. After about 5 minutes of drainage, the degree of residual ink left on the surfaces previously wetted with ink was rated according to the following rating scale by counting the number of residual ink droplets on one half of the surfaces of the bottle that were previously been wetted with ink prior to inversion of the bottle.

| Drainage Rating | Criteria |
| --- | --- |
| Excellent | About 0 to 5 residual ink drops |
| Good | About 5-10 residual ink drops |
| Marginal | About 10 to 20 residual ink drops |
| Poor | Greater than about 20 residual ink drops, or between 5-15% of surface area covered by residual ink |
| Very Poor | Greater than 15% of surface area covered by residual ink |

Polymers were Prepared Using the Following Procedures:

Polymer 1

A 3-liter flask was equipped with a mechanical stirrer, thermometer, nitrogen inlet, drying tube outlet, and addition funnels. Tetrahydrofuran (THF), 760 g, was charged to the flask. The catalyst, tetrabutyl ammonium m-chlorobenzoate, 0.82 g of a 1.0 M solution in acetonitrile, was then added. Initiator, 1,1-bis(trimethylsilyloxy)-2-methyl propene, 24.0 g was injected. Feed I [tetrabutyl ammonium m-chlorobenzoate, 0.4 g of a 1.0 M solution in acetonitrile and THF, 5 g] was started and added over 150 minutes. Feed II [trimethylsilyl methacrylate, 225 g, ethoxytriethyleneglycol methacrylate, 377 g] was added over 45 minutes. At 250 minutes, 100 g of methanol were added to the above solution and distillation began. During the first stage of distillation, about 440 g of solvents were removed to yield a polymer of 49.7% solids. Then 187 g of 2-pyrrolidone were added to the flask. After another 400 g of solvent were distilled off, 225 g of 2-pyrrolidone were added to make a polymer of about 48% solids, number molecular weight average of about 5,800. The polymer prepared has a carbon to oxygen ratio of 2.4 for the hydrophilic component, 74% by weight for the hydrophilic component, and 26% by weight of the ionizable acid group. The polymer contains no hydrophobic components.

Polymer 1a

About 41.3 g of the Polymer 1 solution were combined with about 6.8 g of 45% potassium hydroxide aqueous solution and 51.8 g of water to yield an aqueous polymer solution of ethoxytriethyleneglycol methacrylate -co-methacrylic acid (74/26 weight ratio) at about 20 weight percent concentration.

Polymer 1b

About 41.3 g of the Polymer 1 solution were combined with about 23.1 g of triethanol amine and 55.6 g of water to yield an aqueous polymer solution of ethoxytriethyleneglycol methacrylate-co-methacrylic acid (74/26 weight ratio) at about 20 weight percent concentration.

Polymer 2

A 3-liter flask was equipped with a mechanical stirrer, thermometer, nitrogen inlet, drying tube outlet, and addition funnels. Tetrahydrofuran (THF), 1172 g was charged to the flask. The catalyst tetrabutyl ammonium m-chlorobenzoate, 0.8 ml of a 1.0 M solution in acetonitrile, was then added. Initiator, 1,1-bis(trimethylsilyloxy)-2-methyl propene, 23.8 g was injected. Feed I [tetrabutyl ammonium m-chlorobenzoate, 0.4 ml of a 1.0 M solution in acetonitrile and THF, 5 g] was started and added over 130 minutes. Feed II [trimethylsilyl methacrylate, 226 g and 2-(trimethylsilyloxy)ethyl methacrylate, 587 g] was added over 45 minutes. At 150 minutes, 285 g of methanol were added to the above solution and distillation began. During the first stage of distillation, 1234 g of material were removed. Then 421 g of 2-pyrrolidone were added to the flask. After another 45 g of solvent was distilled off, 150 g of 2-pyrrolidone and 0.3 g dichloroacetic acid were added. Another 74 g of solvent was distilled off to make a polymer of about 45% solids and number molecular weight average of about 5,695. The polymer prepared has a carbon to oxygen ratio of 2.0 for the hydrophilic component, 74% by weight for the hydrophilic component, and a 26% by weight of the ionizable acid group. The polymer contains no hydrophobic components.

Polymer 2a

About 45 g of the Polymer 2 solution were combined with about 6 g of 45% potassium hydroxide aqueous solution and 47 g of water to yield an aqueous polymer solution of 2-hydroxyethyl methacrylate-co-methacrylic acid (74/26 weight ratio) at about 20 weight percent concentration.

Polymer 2b

About 45 g of the Polymer 2 solution were combined with about 2.9 g of triethanol amine and 52.2 g of water to yield an aqueous polymer solution of 2-hydroxyethyl methacrylate-co-methacrylic acid (74/26 weight ratio) at about 20 weight percent concentration.

Polymer 3

Polymer 3 was a structured, block copolymer with methacrylic acid-block-benzyl methacrylate-block-ethyltriethyleneglycol methacrylate prepared in a manner similar to "Preparation 4" described in U.S. Pat. No. 5,519,085 (incorporated by reference herein for all purposes as if fully set forth), with the monomer levels adjusted to give the weight ratio of about 23//59//18 (or mole ratio of about 12//15//4). The polymer was neutralized with potassium hydroxide. Water was added to yield a final polymer concentration at about 20 weight percent. The polymer prepared has a carbon to oxygen ratio of 5.0 for the hydrophobic component, carbon to oxygen ratio of 2.4 for the hydrophilic component, 59% by weight for the hydrophobic component, 18% by weight for the hydrophilic component, and a 23% by weight of the ionizable acid group.

Polymer 4

Polymer 4 was a random copolymer of n-butyl acrylate-co-ethyltriethyleneglycol methacrylate-co-polyethyleneglycol methacrylate in weight ratio of about 40/30/30. A 5-liter flask was equipped with a mechanical stirrer, thermometer, N2 inlet, drying tube outlet, and addition funnels. Ethoxytriethyleneglycol methacrylate, 60 g, n-butyl acrylate, 80 g, Bisomer S10W MPEG 1000, 120 g, and isopropyl alcohol, 790 g, were charged to the flask and heated to reflux. Ethoxytriethyleneglycol methacrylate, 241 g, n-butyl acrylate, 320 g, and Bisomer S10W MPEG 1000, 480 g, were added over 180 minutes. Initiator Vazo-52, 10 g, methyl ethyl ketone, 30 g, and isopropyl alcohol, 30 g, were started simultaneously and added over 210 minutes. When the first initiator feed was completed, a second initiator feed of Vazo-52, 15 g methyl ethyl ketone, 45 g and isopropyl alcohol, 45 g was started and added over 10 minutes. The reaction was held at reflux for additional 110 minutes. 2-pyrrolidone, 750 g, was added to the reaction flask. The solution was heated to reflux and 1086 g of volatile solvent were distilled off. A further 340 g of 2-pyrrolidone were added to the flask to make a polymer of about 43% solids with a number average molecular weight of 6638. Water was added to yield a final polymer concentration at about 20 weight percent. The polymer prepared has a carbon to oxygen ratio of 3.5 for the hydrophobic component, carbon to oxygen ratio of 2.4 for a first hydrophilic component and 2.1 for a second hydrophilic component, 40% by weight for the hydrophobic component, 60% by weight for the hydrophilic component, and a 0% by weight of the ionizable acid group.

Polymer 5

Polymer 5 was prepared as described for Polymer 1 with the exception that Feed II contained trimethylsilyl methacrylate, 225 g, ethoxytriethyleneglycol methacrylate, 377 g, benzyl methacrylate, 5.0 g. The polymer prepared has a carbon to oxygen ratio of 5.0 for the hydrophobic component, carbon to oxygen ratio of 2.4 for the hydrophilic component, 1% by weight for the hydrophilic component, and 26% by weight of the ionizable acid group.

Polymer 5a

About 41.3 g of the Polymer 5 solution were combined with about 6.8 g of 45% potassium hydroxide aqueous solution and 51.8 g of water to yield an aqueous polymer solution of benzyl methacrylate-co-ethoxytriethyleneglycol methacrylate-co-methacrylic acid (1/73/26 weight ratio) at about 20 weight percent concentration.

Pigment Dispersion

Carbon black (Nipex® 160 from Degussa) was oxidized with ozone, according to the process described in U.S. Pat. No. 6,852,156, to create carboxylic acid groups directly attached to the surface. Lithium hydroxide was used during processing to neutralize the treated pigment and convert the surface acid groups to the salt form. The neutralized mixture was purified by ultra-filtration to remove free acids, salts, and contaminants. The purification process was performed by repeatedly washing the pigment with de-ionized water until the conductivity of the mixture leveled off and remained relatively constant.

After recovery, a 15 weight percent dispersion of the self-dispersing carbon black pigment was obtained.

Example 1

Inks were prepared by combining the following ingredients with mixing, followed by filtration through a 2.5 micron filter to remove any oversize material. Ingredient amounts are in weight percent of the total weight of ink.

TABLE 1

| | Ink Formulation | | | | | | | |
|---|---|---|---|---|---|---|---|---|
| | A | B | C | D | E | F | G | H |
| Pigment Dispersion | 40 g | 40 g | 40 g | 40 g | 40 g | 40 g | 40 g | 40 g |
| Glycerol | 4 g | 4 g | 4 g | 4 g | 4 g | 4 g | 4 g | 4 g |
| Diethylene Glycol | 15 g | 15 g | 15 g | 15 g | 15 g | 15 g | 15 g | 15 g |
| Triethylene Glycol-n-butyl ether | 7.5 g | 7.5 g | 7.5 g | 7.5 g | 7.5 g | 7.5 g | 7.5 g | 7.5 g |
| Polymer 1a | — | 9.6 g | — | — | — | — | — | — |
| Polymer 1b | — | — | 9.6 g | — | — | — | — | — |
| Polymer 2a | — | — | — | 9.6 g | — | — | — | — |
| Polymer 2b | — | — | — | — | 9.6 g | — | — | — |
| Polymer 3 | — | — | — | — | — | 9.6 g | — | — |
| Polymer 4 | — | — | — | — | — | — | 9.6 g | — |
| Sodium Borate | — | — | — | — | — | — | — | 0.2 g |

Balance with deinonized Water to 150 g

Corrosion test was performed per ASTM G-5-94 (Anodic Polarization) at 60 degree Centigrade and using Nickel Alloy 42 as working electrodes. Corrosion rate as indicated by the current density in microampers per square centimeter at 400 mV is shown in Table 2 below.

TABLE 2

| Ink Formulation | Current Density | % Improvement Over Control |
|---|---|---|
| A | 675 | Control |
| B | 14 | 98% |
| C | 91 | 87% |
| D | 70 | 90% |
| E | 34 | 95% |
| F | 888 | — |
| G | 293 | 57% |
| H | 33 | 95% |

Ink formulation A contains no polymer additive and is the control. Ink formulations B, C, D, and E that fall within this disclosure, are stable as shown in Table 4, and show an improvement in corrosion resistance. Ink formulations G and H comprising comparative additives, Polymer 4 (40% by weight of the hydrophobic component and 0% by weight ionizable acid group) and sodium borate, show improved corrosion resistance, but these additives cause instability to the inks. Ink formulation F comprising polymer additive, Polymer 3, (59% by weight hydrophobic component) does not have good corrosion resistance.

Concentrated ink formulations were prepared by combining the ingredients shown in Table 3 with mixing. The storage stability of these inks was determined under accelerated conditions at 70 degree Centigrade for 1 week. Results are shown in Table 4. The resultant large increase in the viscosity and/or the particle size indicate instability of those formulations.

TABLE 3

| | Formulation | | | | | |
|---|---|---|---|---|---|---|
| | I | J | K | L | M | N |
| Pigment Dispersion | 40 g | 40 g | 40 g | 40 g | 40 g | 40 g |
| Glycerol | 5 g | 5 g | 5 g | 5 g | 5 g | 5 g |
| Polymer 1a | 3 g | — | — | — | — | — |
| Polymer 1b | — | 3 g | — | — | — | — |
| Polymer 2a | — | — | 3 g | — | — | — |
| Polymer 2b | — | — | — | 3 g | — | — |
| Polymer 4 | — | — | — | — | 3 g | — |
| Sodium Borate | — | — | — | — | — | 0.3 g |

Balance with deionized water to 50 g

TABLE 4

| | Formulation | | | | | |
|---|---|---|---|---|---|---|
| | I | J | K | L | M | N |
| Physical Properties, initial | | | | | | |
| Brookfield Viscosity at 25 C. | 3.43 | 3.32 | 6.18 | 5.39 | Too viscous to be measured | 3.54 |
| Average particle size, nm | 124 | 125 | 141 | 141 | 333 | 116 |
| Physical Properties, After storage at 70 degree Centigrade for 1 week | | | | | | |
| Brookfield Viscosity at 25 C. | 3.50 | 4.43 | 11.00 | 5.58 | gel | 42.40 |
| Average particle size, nm | 124 | 150 | 168 | 135 | 582 | 167 |

The adhesion of inks to hydrophobic surfaces was tested using the procedure described above that measures the drainage from plastic surfaces. Results are shown in Table 5.

TABLE 5

| | Drainage from Plastic Surface |
|---|---|
| Formulation A | Excellent |
| Formulation B | Excellent |
| Formulation D | Marginal |
| Formulation F | Very Poor |
| Formulation G | Poor |

Example 2

Inks were prepared by combining the following ingredients shown in Table 6 with mixing, followed by filtration through a 2.5 micron filter to remove any oversize material. Ingredient amounts are in weight percent of the total weight of ink.

TABLE 6

| Formulation | O | P | Q | R |
|---|---|---|---|---|
| Pigment Dispersion | 66.6 g | 66.6 g | 66.6 g | 66.6 g |
| Glycerol | 10 g | 10 g | 10 g | 10 g |
| Biocide | 0.24 g | 0.24 g | 0.24 g | 0.24 g |
| Polymer 5a | — | 0.45 g | 1.65 g | 1.90 g |
| Balance with deinonized water to 100 g | | | | |

Corrosion test was performed per ASTM G-5-94 (Anodic Polarization) at 25 degree Centrigrade and using Nickel Alloy 42 as working electrodes. Corrosion rate as indicated by the current density in microampers per square centimeter at 400 mV is shown in Table 7 below.

TABLE 7

| Ink Formulation | Current Density | % Improvement Over Control |
|---|---|---|
| O | 700 | Control |
| P | 400 | 43% |
| Q | 100 | 86% |
| R | 10 | 98% |

The invention claimed is:

1. An aqueous ink jet ink and an ink jet print head combination, wherein the ink jet ink comprises:
    (a) a colorant;
    (b) an aqueous vehicle; and
    (c) a random hydrophilic copolymer additive, wherein the random hydrophilic copolymer additive comprises a random copolymer comprised of a hydrophilic component and an optional hydrophobic component, wherein the hydrophilic component comprises a monomer (X) having an ionizable acidic group and having a carbon to oxygen ratio of less than about 2.5, wherein said monomer (X) is present in the amount of more than 10%, based on the weight of the polymer additive, and at least one non-acidie hydrophilic monomer (Y) having a carbon to oxygen ratio of less than about 2.5, and the hydrophobic component comprises a monomer (Z) selected from the group consisting of methyl acrylate, vinyl acetate, a hydrophobic monomer (W) having a carbon to oxygen ratio of at least about 2,5, and mixtures thereof, and wherein the hydrophobic component has a concentration of from 0% to less than about 40% by weight, based on the weight of the polymer additive; and
    wherein the ink jet print head comprises an ink flow passage, at least a portion of which is formed of a nickel-containing metal.

2. The ink jet ink/print head combination of claim 1 wherein the ionizable acidic group is selected from the group consisting of carboxylic acid, suifonic acid and phosphonic acid.

3. The ink jet ink/print head combination of claim 2 wherein the ionizable acid groups with a carbon to oxygen ratio of less than about 2.5 is selected from the group consisting of methacrylic acid, acrylic acid, maleic acid, maleic acid mono-methyl ester, maleic acid mono-ethyl ester, maleic acid mono-propyl ester, maleic acid mono-butyl ester, maleic acid mono-pentyl ester, maleic acid mono-hexyl ester, fumaric acid, fumaric acid mono methyl ester, fumaric acid mono-ethyl ester, fumaric acid mono-propyl ester, fumaric acid mono-butyl ester, fumaric acid mono-pentyl ester, fumaric acid mono-hexyl ester, itaconic acid, itaconic acid mono-methyl ester, itaconic acid mono-ethyl ester, itaconic acid mono-propyl ester, itaconic acid mono-butyl ester, itaconic acid mono-pentyl ester, crotonic acid, acryloyloxyethyl succinate, acrylamido-glycolic acid, acrylamido-propane sulfonic acid and acryiamido-methyl-propane sulfonic acid.

4. The ink jet ink/print head combination of claim 1 wherein the co orant is selected from the group consisting of a pigment dispersion, a self dispersible pigment, a dye, and mixtures thereof.

5. The ink jet ink/print head combination of claim 4 wherein the colorant is a pigment dispersion, a self dispersible pigment, or a mixture thereof.

6. The ink jet inkiprint head combination of claim 1 wherein the hydrophobic monomer (W) having a carbon to oxygen ratio of at least about 2.5 is selected from the group consisting of benzyl methacrylate, butyl methacrylate, methyl methacrylate, ethyl methacrylate, propyl methacrylate, hexyl methacrylate, 2-ethythexyl methacrylate, octyl methacrylate, lauryl ethacrylate, stearyl methacrylate, phenyl methacrylate, phenoxyethyl methacrylate, p-tolyl rnethaerylate, sorbyl tuethaerylate, ethyl acrylate, propyl acrylate, butyl acrylate, hexyl acrylate, 2-ethylhexyl acrylate, octyl acrylate, lauryl acrylate, stearyl aerylate, phenyl acrylate, phenoxyethyl aerylate, p-tolyl acrylate, sorbyl acrylate, styrene, alpha-methyl styrene, substituted styrenes, IN-alkyi aerylamides, N-alkyl methaerylamides, vinyl butyrate and vinyl benzoate.

7. The ink jet ink/print head combination of claim 1 wherein the hydrophilic monomer (Y) with carbon to oxygen ratio of less than about 2.5 is a non-ionic, non-acidic monomer selected from the group consisting of ethoxy triethyleneglycol methacrylate, (methoxy-ethoxy)ethyl acrylate, methoxy polyethylene glycol methacrylate, polyethylene glycol monomethacrylate, glycidyl methacrylate, glycidyl acrylate, hydroxyeth methacrylate, hydroxypropyl methacrylate, hydroxyethyl acrylate, and hydroxypropyl acrylate.

8. The ink jet ink/print head combination of claim 7 wherein the hydrophilic monomer (Y) is ethoxy triethyleneglycol methacrylate, polyethylene glycol methacrylate, or hydroxyethyl methacrylate.

9. The ink jet ink/print head combination of claim 1 wherein the random hydrophilic copolymer additive has a number average molecular weight of about 1,000 to about 10,000.

10. The ink jet ink/print head combination of claim 1 wherein the random hydrophilic copolymer additive may be present in the amount of about 0.01 wt % to about 3 wt %, based on the total weight of ink.

11. The ink jet ink/print head combination of claim 1 wherein the random hydrophilic copolymer additive to pigment ratio is about 1:1 to about 1:40.

12. The ink jet ink/print head combination of claim 1 wherein the hydrophobic component has a concentration of less than about 15% by weight, based on the weight of the polymer additive, 13. The ink jet ink/print head combination of claim 1 wherein the ionizable acidic group is present in the amount of at least 20% by weight, based on the weight of polymer additive.

14. The ink jet ink/print head combination of claim 1 wherein the ink further comprises a vehicle comprised of water or a mixture of water and at least one water-soluble organic solvent (co-solvent).

15. The ink jet ink/print head combination of claim 1 wherein the hydrophobic component has a concentration of less than about 2% by weight, based on the weight of the polymer additive.

16. The ink jet ink/print head combination of claim 1 wherein the hydrophobic component has a concentration of about 0% by weight, based on the weight of the polymer additive.

17. The ink jet ink/print head combination of claim 1 wherein the ink jet ink has a current density at 400 mV of 100 µA per cm² or less.

18. An aqueous ink jet ink and an ink jet print head combination, wherein the ink jet ink comprises:
 (a) a colorant;
 (b) an aqueous vehicle; and
 (c) a random hydrophilic copolymer additive, wherein the random hydrophilic copolymer additive comprises a random copolymer comprised of a hydrophilic component and optional hydrophobic component, wherein the hydrophobic component comprises a monomer (Z) selected from the group consisting of methyl acrylate, vinyl acetate, a hydrophobic monomer (NV) having a carbon to oxygen ratio of at least about 2.5, and mixtures thereof, and wherein the hydrophobic component has a concentration of from 0% to less than about 40% by weight, based on the weight of the polymer additive, and the hydrophilic component comprises at least one non-acidic hydrophilic monomer (Y) having a carbon to oxygen ratio of less than about 2.5, and a monomer (X) with an ionizable acidic group with a carbon to oxygen ratio of less than about 2.5 present in the amount of more than 10%, based on the weight of the polymer additive; and wherein the hydrophilic monomer (Y) having a carbon to oxygen ratio of less than about 2.5 has the following structure:

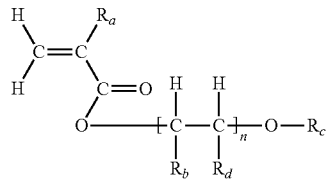

wherein n is an integer greater than about 0,
$R_a$ $R_b$ and $R_d$ are independently either H or alkyl, and $R_c$ is alkyl; and
wherein the ink jet print head comprises an ink flow passage, at least a portion of which is formed of nickel-containing metal.

19. The ink jet ink/print head combination of claim 18 wherein n is about 1 to about 10.

20. The ink jet ink/print head combination of claim 18 wherein n is about 1 to about 4.

21. The ink jet ink/print head combination of claim 18 wherein the non-acidic hydrophilic monomer (Y) is selected from the group consisting of ethoxy triethyleneglycol methacrylate, (methoxy-ethoxy)ethyl acrylate, methoxy polyethylene glycol methacrylate, glycidyi methacrylate, and glycidyi acrylate.

22. An aqueous ink jet ink and an ink jet print head combination, wherein the ink jet ink comprises:
 (a) a colorant;
 (b) an aqueous vehicle; and
 (c) a random hydrophilic polymer additive, wherein the random hydrophilic polymer additive is a random copolymer comprised of components A to C as follows:
 A. more than 10 weight % of a hydrophilic monomer selected from the group consisting of monomers having an ionizable acidic group;
 B. at least 25 weight % of a monomer or a combination of monomers selected from the group consisting of monomers of formula I:

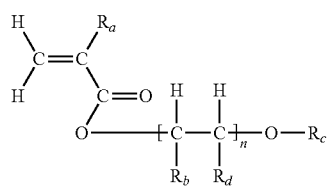

(Formula I)

wherein n is an integer greater than 0; $R_a$, $R_b$ and $R_d$ are independently either H or alkyl, and R, is alkyl; and
 C. 0-40 weight % of a hydrophobic monomer or combinations of such monomers;
wherein the total of monomers A B C is equal to 100 weight %, and the total of monomers A +B is 55-100 weight % (weight % of monomers is based on the weight of the polymer additive).

23. The ink jet ink/print head combination of claim 22 wherein the weight ratio of monomer B:A is in the range of about 1:1 to about 10:1.

24. The ink jet ink/print head combination of claim 22 or 23, wherein monomers A and C are acrylic or methacrylic monomers.

* * * * *